July 1, 1958 D. D. MYNICK 2,841,417
UNIVERSALLY ADJUSTABLE CONNECTION
HAVING PLURAL SWIVELS
Filed Aug. 16, 1954 2 Sheets-Sheet 1
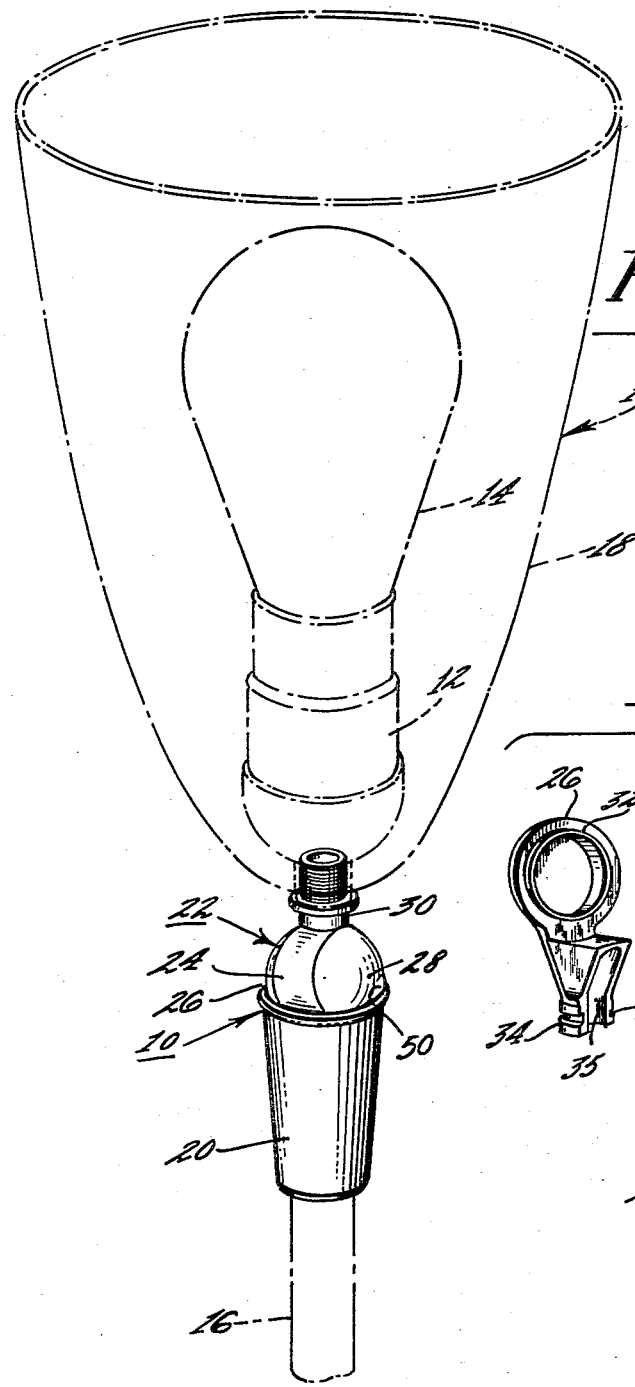
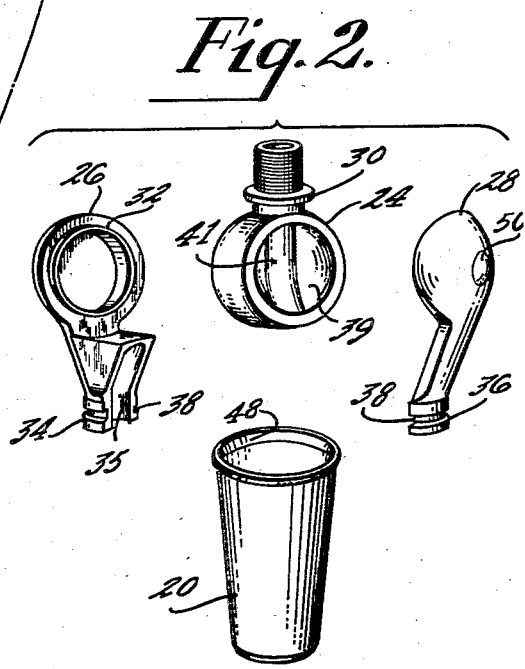
INVENTOR.
David D. Mynick
BY Jacob C. Kellem
ATTORNEY

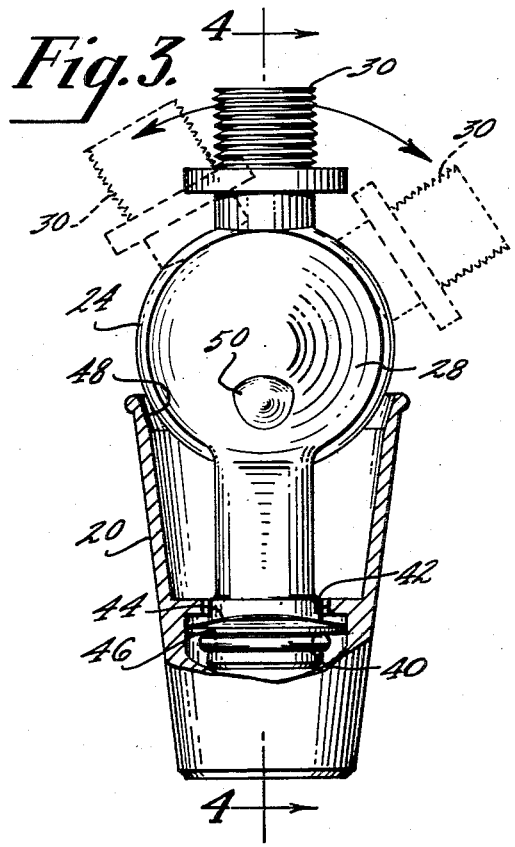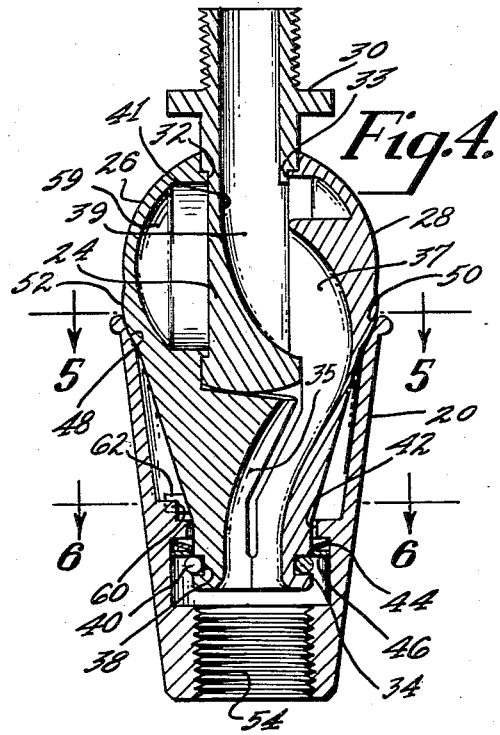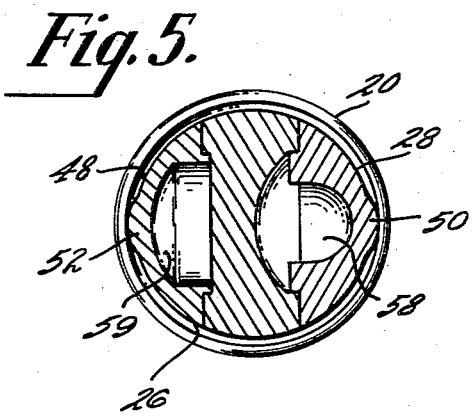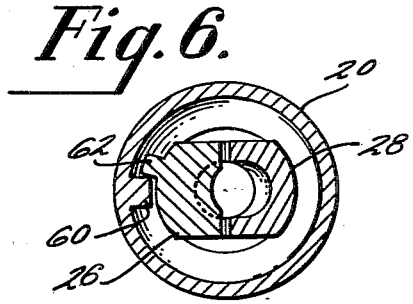
INVENTOR.
David D. Mynick
BY Jacob C. Kellem
ATTORNEY

United States Patent Office 2,841,417
Patented July 1, 1958

2,841,417

UNIVERSALLY ADJUSTABLE CONNECTION HAVING PLURAL SWIVELS

David D. Mynick, Philadelphia County, Pa., assignor to Universal Brass Works, a partnership of Pennsylvania Application April 16, 1954, Serial No. 423,751

7 Claims. (Cl. 285—168)

This invention relates to a novel universally adjustable connector, and more particularly to a novel universally adjustable swivel connector for electrical appliances.

Commonly used electrical appliances frequently have movable functional elements which are adjustably connected to supporting structural elements. An electric lamp, for example, may have its illuminating fixture adjustably connected to a supporting rod or bracket. Some illuminating fixtures may be set in any position relative to their supporting rods. They must, therefore, be connected to their supporting rods by connectors which are universally adjustable, i. e. free to move in any direction. Since lamps may also serve decorative functions as well as illuminating functions, the connectors should be esthetically appealing as well as mechanically functional. This invention teaches how a novel universally adjustable swivel connector which possesses many inherent advantages may be constructed.

An object of this invention is to provide a decorative universally adjustable swivel connector which may be economically manufactured.

Another object is to provide a universal swivel connector which is easily adjusted to remain firmly set in any position.

A further object is to provide a universal swivel connector which requires no further adjustment or tightening even after sustained use.

Still a further object is to provide a universal swivel connector having the aforementioned characteristics and through which an electric wire can be inserted while the connector remains assembled.

A highly functional and decorative universally adjustable swivel connector for an illuminating lamp may be constructed according to the teachings of this invention. The structure taught by this invention provides a universally adjustable swivel connector inherently possessing favorable mechanical and decorative characteristics. The illuminating fixture is connected to a point on the edge of a rotatable member. This rotatable member is rotatably upheld by two opposed supporting members which bear against it. The outer surfaces of the supporting members may be shaped to form an ornamental object, for example, a ball in conjunction with the edge of the rotatable member held between them. The supporting members have legs which are forceably engaged or held in contacct with, a retaining member. The mode of engagement is such that it allows the supporting members to be rotated in a plane relative to the retaining member. This forceable engagement also causes surfaces of the supporting members to radially bear against the retaining member. This reactively forces the supporting members to bear radially against and firmly uphold the rotatable member.

The mating surfaces of the rotatable member and the supporting members are cooperatively formed to provide a radial bearing. The rotatable member, therefore, may be rotated in a plane within this bearing. The supporting members carrying the rotatable member between them may be also rotated relative to the retaining member in another plane. Movement of the illuminating fixture attached to a point on the rotatable member is, therefore, provided in two planes which may be disposed at any angle relative to one another. This enables the fixture to be pointed in any direction.

The force drawing the supporting members into engagement with the retaining members maintains frictional resistance against relative movement between the retaining member and the supporting members and between the supporting members and the rotatable member. This maintains the connector steadily and firmly set in any position to which it is adjusted. Any slack in the connector which may be caused by wear is taken up by the force which may, for example, be resiliently applied. A steady frictional resistance is therefore maintained on the connector even after long sustained use.

Other objects and advantages of the present invention will become apparent to one skilled in the art from a reading of the following specification in conjunction with the accompanying drawing of an illustrative example constructed according to the teachings of the present invention in which:

Fig. 1 is a perspective view of this assembled illustrative swivel connector with attached illuminating fixture and supporting rod shown in phantom, Fig. 2 is an exploded view of this illustrative swivel connector, Fig. 3 is a side elevation of this illustrative swivel connector partially in cross section, Fig. 4 is a vertical cross section through this illustrative swivel connector, Fig. 5 is a horizontal cross section taken through Fig. 4 along the lines 5—5, and Fig. 6 is a horizontal cross section taken through Fig. 4 along the lines 6—6.

In Fig. 1 is shown a perspective view of the swivel connector 10 as it may be used to provide a universally adjustable swivel connector for an illuminating fixture 11. The connector 10 is shown joining the incandescent lamp socket 12 to the supporting rod 16 of an illuminating lamp. The connector 10 is visibly made up of a sleeve 20 and a ball-shaped swivel member 22. The sleeve portion 20 of the connector may be attached at one end thereof to the supporting rod 16. The ball-shaped swivel member 22 which is of a larger diameter than the open end of the sleeve is retained in the socket formed by the open end of the sleeve.

The ball-shaped member 22 is itself made up of a disc 24 which is rotatbly held between two supporting members 26 and 28. A threaded coupling 30 may be attached to a point on the edge of the disc. The electric light socket 12 and a shade 18 may be secured to the threaded coupling 30. An incandescent lamp 14 may be installed in socket 12.

The illuminating fixture 11 may be moved or pointed in any direction with respect to the supporting rod 16. The two planes of rotation provided by the swivel connector 10 makes this universal directivity possible. The entire ball-shaped member 22 may be rotated in a horizontal plane within the socket formed by the open end of the sleeve 20. The disc 24 and its attached threaded coupling 30 may be rotated in a vertical plane within the bearing provided by supporting members 26 and 28. The illuminating fixture 11 may be, therefore, moved in these two planes of motion to point in any given direction.

A force may be exerted by a retaining means concealed within the sleeve to maintain a steady tension to draw the ball-shaped member 22 into the socket formed by the open end of the sleeve. This causes the lip of the sleeve to bear radially inward against the outer surfaces of supporting members 26 and 28. This causes the bearing faces provided by members 26 and 28 to bear against the disc 24. A steady frictional resistance is, therefore, maintained against relative movement between the supporting members and the socket and between the supporting members and the disc to maintain these components fixed steadily and firmly in any position to which they are set. The retaining force may be of a resilient nature to permit easy adjustment and to maintain the application of the force after the mating parts have worn.

In Fig. 2 is shown an exploded view of the various parts of the universally adjustable swivel connector. The supporting members 26 and 28 are shown to have extended portions or legs which are secured within the sleeve 20. The ends of these legs at 34 and 36 may be shaped to be joined together and may together form a round cross section. The groove 38 is provided for a retaining ring (not shown) which may join these legs together. The joined ends of the supporting members may be inserted within the sleeve 20 and may be anchored within a bearing member (not shown). This bearing may be resiliently anchored to the sleeve 20. The resilient anchoring force on the legs draws the larger diameter portion of the supporting members holding this disc into the socket provided by the open end of the sleeve. The wall of the sleeve reacts to force the supporting members radially inward. This causes the raised cylindrical projection 32 in the radial bearing face of supporting member 26 and a cylindrical similar projection 33 (not shown) on the bearing face of supporting member 28 to bear against the sides of disc 24 and enter within corresponding round sockets which may be formed in the sides of the disc. The reactive force exerted by the sides of the sleeves upon the supporting members, therefore, holds the disc firmly within the bearing provided by the supporting members. The illuminating fixture 11 may be moved in a vertical plane along with the disc within the bearing provided by supporting members. The fixture along with entire ball-shaped assembly may be moved in a horizontal plane within the socket provided by the open end of the sleeve.

A passageway for insertion of an electric wire is provided by the combination of the cored portion 35 of supporting member 26, the cored portion 37 of supporting member 28 (not shown), and the cored portion 39 of disc 24 leading to the hole 41 through threaded coupling 30.

In Fig. 3 is shown in phantom two alternate positions that the threaded coupling may assume when rotated in a vertical plane along with disc 24 held between the supporting members 26 and 28.

In Figs. 3 and 4 are shown details of the manner in which the supporting members and disc are anchored within the sleeve 20. It is shown how the ends of the supporting members 26 and 28 are joined together by a retaining ring 40 which may be locked within groove 38. The inner portion of the sleeve may be formed to provide a round aperture 42. The fastened legs of the supporting members may be inserted through this aperture. Spring 44 and washer 46 may be slipped over the joined legs before the retaining ring 40 is inserted in groove 38. The washer and retaining ring may provide a bearing means disposed upon the legs. The combination of the spring, washer and retaining ring may axially anchor the joined ends of the supporting members within the aperture or bearing 42. The supporting members may be, therefore, free to rotate within the aperture.

This rotation is not entirely free, however, since the resilient force exerted by the spring causes the outer portions of the supporting members to bear against the socket provided by the lip of the sleeve 20. The open end or lip of sleeve 20 may have a internal taper as shown at 48. This helps the inner surface of the open end of the sleeve bear against the supporting members in a direction to cause the supporting members to firmly grip the rotatable disc 24.

To facilitate assembly and fitting and to minimize to a certain extent the frictional resistance against rotation of the supporting members within the open end of the tapered sleeve, raised surface portions or prominences 50 and 52 may be provided on the outer surfaces of the supporting members 26 and 28 respectively. The size of these prominences is exaggerated on the drawing to make them stand out clearly for clarity of presentation and description. These raised surfaces provide small areas of contact between the supporting members and the tapered lip of the sleeve. The reactive force exerted by the sleeve, therefore, may be concentrated through these raised portions.

In Fig. 4 is shown how the raised radial cylindrical projections 32 and 33 on the outer surface of supporting members 26 and 28 respectively may fit closely within recesses which may be formed on the sides of the rotating disc 24. These raised projections or faces 32 and 33 provide bearing surfaces upon which the recess formed in disc 24 is supported. The reactive inward radial pressure exerted against supporting members 26 and 28 holds the disc firmly yet allows it to be rotated in a vertical plane.

In Fig. 4 the passageway provided extending completely through the swivel connector is clearly shown. An electrical wire may be, therefore, inserted completely through the assembled swivel connector without disassembly. The wire may be inserted through the threaded end of the sleeve through the joined ends of the supporting members and then through the cored passageway 37 which is formed within supporting member 28 and through the cored passageway 39 which is formed within the rotatable disc 24. It then may pass directly out through the center hole 41 of the threaded bushing 30.

A threaded hole 54 may be provided in the base of the sleeve 20 to provide a means for attaching the sleeve to a supporting rod which is correspondingly threaded. Other means for attaching the sleeve to a supporting rod may be provided such as a sweat type solder connector. There are other recesses within the supporting members and the rotatable disc in positions where they are not externally visible. The recesses may be provided to conserve metal if the various parts are manufactured by a casting process. This connector is well adapted to be fabricated by a casting process.

In Fig. 5 is shown a cross section taken through Fig. 4 along the line 5—5 in the direction of the arrows. This cross section clearly shows the raised portions 50 and 52 which may be provided upon supporting members 26 and 28 and the manner in which they seat within the open end or socket provided by sleeve 20. A section of the cored passageway for threading an electric wire through the assembled connector is shown at 58. The core 59 may be removed from the supporting member 26 to conserve material.

In Fig. 6 is shown a cross section taken through Fig. 4 along the lines 6—6 in the direction of the arrows. This shows a section taken through the joined legs of the supporting members 26 and 28. A projection 60 may be provided on the inner wall of the sleeve. A lug 62 may be provided on the outer portion of the supporting member 26 in an axial position corresponding to that of the projection 60. This contacting projection and lug are provided to prevent unlimited rotation of the supporting members within the sleeve. This is done to prevent the electric wire extending through the connector from being twisted completely around and broken off.

This swivel connector is well adapted to be formed by a casting or die casting process. Materials such as brass or any typical die casting compound may be used to make it. Within the spirit of the invention, however, any material or fabrication method may be employed.

What is claimed is:

1. A universally adjustable swivel connector comprising a rotatable member, a pair of first circular bearing elements being disposed on opposite sides of said rotatable member and in line with each other, a sleeve, a pair of supporting members each having a second circular bearing element adjacent to one of its ends, said second circular bearing elements being engaged with said first circular bearing elements, the other ends of said supporting members being inserted within said sleeve with the mouth of said sleeve in contact with the outer surfaces of said supporting members which bear against said mouth at an angle when engaged with said rotatable member, corresponding portions of the inserted ends of said supporting members and said sleeve including cooperating projections and indentations for axially locking said inserted ends of said supporting members within said sleeve while allowing relative rotation between said supporting members and said sleeve, a resilient means reacting in an axial direction between said cooperating projections and indentations to draw said supporting members within said sleeve and to cause said mouth of said sleeve to forcefully react against said supporting members to maintain said first and second circular bearing elements forcefully engaged, and connecting means upon said rotatable member and said sleeve which are maintained in relative positions to which they have been adjusted by rotation of said rotatable member with respect to said supporting members and rotation of said supporting members with respect to said sleeve by the forceful contact of the mouth of said sleeve upon said supporting members and said forceful engagement of said first and second circular bearing elements.

2. A connector as set forth in claim 1 wherein said rotatable member is comprised of a disc, said first circular bearing elements being circular indentations in the sides of said disc, said second circular bearing members being circular projections adjacent to the ends of said supporting members, and the outer exposed surfaces of said supporting members being spherically shaped to cooperate with the outer surface of said disc to provide the appearance of a ball held within the mouth of said sleeve.

3. A connector as set forth in claim 2 wherein said sleeve tapers from a wider end holding said ball to a narrower end remote from said ball.

4. A connector as set forth in claim 1 wherein said connecting means upon said sleeve is incorporated in the end of said sleeve opposite said mouth in contact with said supporting members, and a rod is thereby secured to said sleeve.

5. A connector as set forth in claim 1 wherein said ends of said supporting members are inserted through a bearing within said sleeve, the outer portions of said ends extending past said bearing including a circumferential groove, a locking ring inserted within said groove, and a spring inserted between said ring and said bearing for resiliently drawing said supporting members into said sleeve.

6. A connector as set forth in claim 1 wherein said supporting members and said rotatable member include passageways for passing an electric wire through said assembled sleeve, supporting members, and said rotatable member.

7. A connector as set forth in claim 1 wherein said supporting members include prominences for bearing against the mouth of said sleeve to minimize the frictional resistance therebetween.

References Cited in the file of this patent

UNITED STATES PATENTS

| | | |
|---|---|---|
| 100,868 | Cushing | Mar. 15, 1870 |
| 545,485 | Goddu | Sept. 3, 1895 |
| 807,857 | Palmenberg | Dec. 19, 1905 |
| 815,563 | Stevenson | Mar. 20, 1906 |
| 1,009,913 | Maguire et al. | Nov. 28, 1911 |
| 2,395,178 | Fiori | Feb. 19, 1946 |
| 2,476,850 | Fiori et al. | July 19, 1949 |
| 2,617,619 | Versen | Nov. 11, 1952 |